Feb. 10, 1953  B. KLEINSMITH  2,627,882
POWER-DRIVEN RECIPROCATING SAW
Filed Sept. 13, 1948
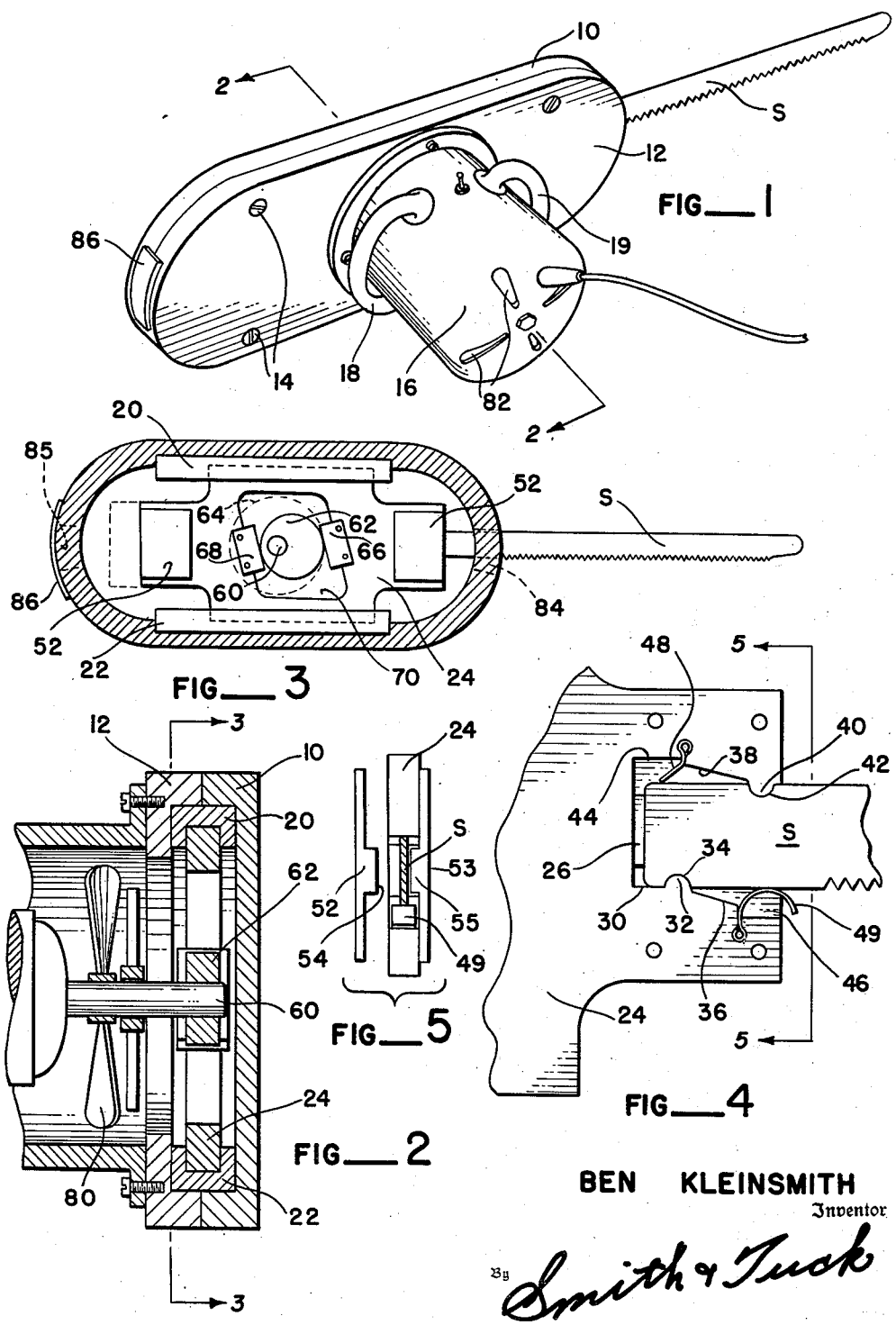
BEN KLEINSMITH
Inventor
By Smith & Tuck
Attorneys Patented Feb. 10, 1953

2,627,882

UNITED STATES PATENT OFFICE 2,627,882

POWER-DRIVEN RECIPROCATING SAW

Ben Kleinsmith, Seattle, Wash.

Application September 13, 1948, Serial No. 49,001

2 Claims. (Cl. 143—68)

My present invention relates to the general art of power tools and more particularly to a power driven reciprocating saw.

My tool, which may be driven by either an electric motor or by a flexible shaft from some suitable source of power, is conceived with the general idea of working close to walls or partitions or the like. It consists essentially of a housing in which is disposed means for converting rotary movement into reciprocating movement and means for quickly and firmly securing reciprocable tools so that they may project from either end of the housing. The principal use which is now envisioned for my tool is in the employment of cantilevered saw blades which are secured only at one end. However, it has been found that various sanding and polishing tools can be similarly employed with my equipment, and certain types of filing can be very satisfactorily accomplished.

The principal object of my present invention is to provide a compact, light-weight and simplified reciprocating means for giving reciprocating motion to various cutting tools.

A further object of my invention is to provide a reciprocating power tool which has means embodied therein so that the tool, as a saw, for instance, can be inserted in either end of the housing and secured to the reciprocating elements, so that maximum convenience is provided in working in restricted areas, for instance.

A further object of my invention is to provide a reciprocating saw in which the weight of the mechanism and drive means can normally be supported from the surface of the material to be cut or otherwise worked on, so that the equipment can be used by an operator over long periods without fatigue.

A further object of my invention is to provide a housing for my tool mechanism so arranged that the saw can be presented to the work at any desirable angle and which will permit ready inspection of the course of the saw cut.

A further object of my invention is to provide a quick detachable means which will securely hold a tool, such as a saw in operating position, yet permit it's quick and easy removal, as in substituting one tool for another, for instance.

A further object of my invention is to provide means whereby the driving means for the equipment drives a fan and the discharge from this fan is directed out through the housing of my tool in such a manner that the saw-dust or other debris will be blown out along the tool channel and thus prevent any accumulation of the same within the housing.

Further objects, advantages and capabilities will be apparent from the description and disclosure in the drawings, or may be comprehended or are inherent in the device.

In the drawings:

Figure 1 is a perspective view showing one physical embodiment of my invention;

Figure 2 is a fragmentary sectional view taken along the line 2—2 of Figure 1;

Figure 3 is a cross-sectional view taken along the line 3—3 of Figure 2;

Figure 4 is an enlarged fragmentary view showing the manner in which a saw, for instance, is secured in operative position within my tool;

Figure 5 is a bracketed view taken substantially along the plane of line 5—5 of Figure 4.

Referring more particularly to the disclosure in the drawings, the numerals 10 and 12 designate the two companion housing members which form the real framework of my power tool. These two housing members are adapted to be joined together as by a plurality of screws 14, so as to form a substantially oil tight housing for the various parts making up my reciprocating tool holder. It will be noted in Figures 1 and 3, that both ends of the housing are substantially semi-circular. This has been found to be very desirable, in that it permits the tool to be rested on the working surface and be easily supported by the operator in any angular position within the plane of the saw.

Adapted to be secured to housing member 12 is the electric driving motor 16. For most uses, particularly where light weight tools of small proportions are desired, it is most satisfactory to have the motor fixedly secured to the housing. If, however, the tool were made on a larger scale, then it might be more practical to employ merely an attaching plate so that a flexible shaft-drive could be employed. Secured to motor 16, are, preferably, two handles as 18 and 19, so that one or the other will be convenient for handling the tool in accordance with which end of the housing is employed as the self-supporting end.

The internal mechanism, which achieves the conversion of the rotary action of the motor into reciprocating movement for operating of a saw or other cutting or polishing tools is probably best shown in Figure 3. Secured in clamping arrangement by housing members 10 and 12, are the slide guide ways 20 and 22. These are formed as channel section members as they are wholly depended upon to provide the guiding action for the main slide member 24. They should preferably be arranged as easily replaceable units of softer material than the slide 24. Normally it has been found best to form slide 24 of a good grade of steel and guide-ways 20 and 22 of one of the non-ferrous bearing metals. The slide 24 is made with two symmetrical opposite ends. The purpose is to provide a convenient means for attachng tools as the operated saw S to either end of slide 24 so that my tool can be most conveniently used by either right or left handed people, or more particularly in restricted quarters, as against a wall or up against a ceiling or for similar uses. The construction of each of the ends of slide 24 will be more fully understood from a study of Figures 4 and 5.

Referring to Figures 4 and 5, it will be noted that the body of slide 24 has a through slot 26, which lends itself quite readily to stamping operations. This provides a rest portion as 30, and an inwardly directed saw engaging lug 32, which is adapted to engage a similar female notch 34 in the saw. The lower rest portion 30, on the outward side from lug 32 is beveled at 36 so that it may cooperate with a similar bevel at 38, surfaces 36 and 38 being substantially parallel with each other. Outwardly disposed from surface 38 is a lug 40, which is adapted to engage a female notch 42 in saw S. Lugs 32 and 40 co-act to hold saw S in position but need not necessarily be of the same size. It is essential, after the showing of Figure 4 that lug 32 be disposed well inwardly in slot 26 and that lug 40 disposed as far outwardly as strength of materials will permit. On the ends opposite lugs 32 and 40, surfaces 36 and 38 are provided with areas of added relief as 44 and 46, and in these areas, suitable resilient springs as 48 and 49 are disposed, each with the purpose of holding saw S in tight engagement with the lug opposite it. In order to provide against transverse movement of the saw S I have provided the keeper plates 52 and 53 which are suitably secured to slide 24. Each of these keeper-plates have an inwardly extending lug or bearing portion as 54 and 55 respectively, which are such a height as to provide a loose guiding bearing for saw S. These are so disposed so as to avoid the saw teeth, which might of course be set in a manner to extend out beyond the sidewall of the saw proper.

In order to remove the saw S from its secured position within slide 24, the operator should press downwardly on the back or side opposite from the teeth of saw S and this will compress springs 48 and 49 and remove the saw from lugs 32 and 40. Then by pulling the saw outwardly at its removal angle, in engagement with surfaces 36 and 38, the saw can easily be removed and, when it is desired to replace the saw or a substitute one, it should be entered in a reverse manner.

In providing my present tool, it is intended that in proportion to the size of the tool, the stroke should be kept reasonably short and this will permit of direct connection with the ordinary fractional horse-power motor of the alternating current type. I therefore provide on the end of motor shaft 60, and fixedly thereto, the eccentric 62. This eccentric will travel about shaft 62 and the outer limits of its travel have been indicated by the dotted line 64, in Figure 3. Now, eccentric 62 for best operation should be of steel, hardened and ground to present a smooth hard surface, and as slide 24 is similarly produced, from steel preferably, I provide the non-ferrous bearing block as 66 and 68, which are secured on the inner surface of the eccentric opening 70 formed within slide 24. These blocks, 66 and 68 should have sufficient length to at all times provide a bearing for eccentric 62, and the distance between these two blocks should be accurately adjusted so that a snug bearing is provided on each side of the eccentric, to achieve this, shims may be placed under block 68 and 66 and thus no slack will be present in the relatively high speed operation of these parts.

In Figure 2, I have illustrated the fan 80. Fan 80 is so positioned and spaced as to draw in air through opening 82 in the housing of motor 16, and to pass it through the motor and then to discharge it out through the opening provided in the housing member for saw S. Referring to Figure 3 it will be noted that there is an opening at 84 and 85, and the end opposite from that being used for the saw is covered with a cover plate, as 86. The purpose of this circulation of air is to insure that at all times there will be a current of air passing out through the opening 84 or 85 that provides the port through which the saw is operated. This provides means for, first of all, discouraging the entry of saw-dust and like material into the inside of the housing and any materials that may have been picked up through laying the tools down when not running, or the like, will be blown out through this opening and no accumulation will occur within the housing. This is very desirable in that, due to the construction, the reciprocating mechanism can be normally lubricated only by means of some of the heavy greases and these, of course, cease to serve their function if outside grit, dust or saw-dust or metal chips, if metal saw is used, could find their way into the interior parts of the housing.

It will be readily apparent, it is believed, that it is relatively simple to remove saw S from its engagement with slide 24, and to re-engage it with the similar mechanism on the other end of slide 24. This is considered to be a very important feature of my tool, and this further taken into conjunction with the fact that housing member 10 is smooth on one side and that the saw runs in a plane close to this side, it is readily apparent, it is believed, that such an arrangement permits the use of a saw very close to partitions and the like, something, that it is believed, has not been achieved before in the power-tool field.

It is believed that it will be clearly apparent from the above description and the disclosure in the drawings that the invention comprehends a novel construction of a power driven reciprocating saw.

Having thus disclosed the invention, I claim:

1. A power operated reciprocating saw, comprising: a saw blade; an electric motor having a power shaft; a housing having rounded ends and formed by two housing members positioned side by side and each rounded end having an opening centered therein for receiving said saw blade; two guideways spaced apart one from another and positioned in said housing; a slide disposed between said guideways to move longitudinally of said housing; said housing members having secured on one face said electric motor with said power shaft normal to said slide; an eccentric mounted on said power shaft; said slide having an opening therein to receive said eccentric; bearing pads secured at opposite ends of said slide opening and abutting opposite sides of said eccentric; said slide having a slot in each end to receive and secure the inner end of said saw blade at either end of said housing, there being inwardly directed lugs at either side of each of said slots, one being positioned closer to the adjacent end of said housing than the other lug, and said saw blade having matching notches in its sides to engage said lugs, each slot having parallel portions extending at an angle to the longitudinal axis of said housing permitting twisting of said saw blade therein for removal and insertion of said blade; resilient means at each side of each slot for urging said saw blade to assume a position in said slots aligned with the longitudinal axis of said housing; a fan blade mounted on said power shaft to provide for circulation of air through said housing and out of said openings therein; and the face of said housing members opposite the face supporting said motor being substantially flat and parallel to the plane of said saw blade and spaced closely thereto.

2. A power operated reciprocating saw, comprising: a saw blade; an electric motor having a power shaft; a housing having a blade receiving opening in each end thereof; two guideways spaced apart one from another and positioned in said housing; a slide disposed between said guideways to move longitudinally of said housing; said electric motor being mounted on one face of said housing with said power shaft normal to said slide; an eccentric mounted on said power shaft; said slide having an opening therein and said eccentric being positioned in said opening to move said slide; said slide having a slot in each end to receive and secure the inner end of said saw blade at either end of said housing, there being inwardly directed lugs at either side of each of said slots and said saw blade having matching notches in its sides to engage said lugs, said slots having portions extending at an angle to the longitudinal axis of said housing permitting twisting of said saw blade in said slots for removal and insertion of the same; resilient means for urging said saw blade to assume a position in said slots aligned with the longitudinal axis of said housing; a fan powered by said motor and discharging air through said housing and out of said end openings therein; and the face of said housing opposite said electric motor being substantially flat and parallel to the plane of said saw blade and spaced closely thereto.

BEN KLEINSMITH.

REFERENCES CITED

The following references are of record in the file of this patent:

UNITED STATES PATENTS

| Number | Name | Date |
|---|---|---|
| 52,285 | Gilliam | Jan. 30, 1866 |
| 1,361,021 | Copeman | Dec. 7, 1920 |
| 1,481,055 | Fullbright | Jan. 15, 1924 |
| 1,556,547 | Ricard | Oct. 6, 1925 |
| 1,586,906 | Lewis | June 1, 1926 |
| 1,648,008 | Selby et al. | Nov. 8, 1927 |
| 2,284,693 | Tompkins | June 2, 1942 |
| 2,488,947 | Vavrik | Nov. 22, 1949 |